United States Patent [19]
Lee

[11] Patent Number: 5,836,785
[45] Date of Patent: Nov. 17, 1998

[54] APPARATUS AND METHOD TO UNIQUELY IDENTIFY SIMILARLY CONNECTED ELECTRICAL DEVICES

[75] Inventor: Sherman Lee, Rancho Palos Verdes, Calif.

[73] Assignee: Advanced Micro Devices, Inc., Sunnyvale, Calif.

[21] Appl. No.: 854,794

[22] Filed: May 12, 1997

Related U.S. Application Data

[63] Continuation of Ser. No. 399,323, Mar. 6, 1995, abandoned.

[51] Int. Cl.$^6$ ............................................. H01R 11/00
[52] U.S. Cl. ........................ 439/505; 439/498; 439/489; 439/65; 439/955
[58] Field of Search ......................... 439/505, 498, 439/489.2, 188, 955, 489, 502, 65

[56] References Cited

U.S. PATENT DOCUMENTS

| | | | |
|---|---|---|---|
| 3,191,095 | 6/1965 | Hefti | 439/955 |
| 4,418,971 | 12/1983 | Liss | 439/489 |
| 4,468,612 | 8/1984 | Starr | 439/489 |
| 4,569,044 | 2/1986 | Tao et al. | 370/85 |
| 4,973,264 | 11/1990 | Kamono et al. | 439/498 |
| 5,181,858 | 1/1993 | Matz et al. | 439/955 |
| 5,288,246 | 2/1994 | Whiteman, Jr. et al. | 439/498 |
| 5,330,370 | 7/1994 | Reddersen et al. | 439/955 |
| 5,366,382 | 11/1994 | Thumma | 439/188 |
| 5,374,200 | 12/1994 | Giroux | 439/188 |
| 5,459,840 | 10/1995 | Isfeld et al. | 395/309 |
| 5,470,243 | 11/1995 | Bendorf | 439/188 |

OTHER PUBLICATIONS

Advanced Micro Devices, *AM79C987 Hardware Implemented Management Information Base™ (HIMIB™) Device: Preliminary Data Sheet*, Feb. 1993, (Full Text).

Advanced Micro Devices, *ISA–HUB™—KT Am 79C981 and Am79C987 Based Ethernet Managed Server Hub Card: Final Data Sheet*, Feb. 1993, (Full Text).

Advanced Micro Devices, *Am79C981/Am79C987 IMR+/HIMIB Security Features*, Aug. 1993, (Full Text).

Advanced Micro Devices, *IEEE 802.3 Repeater: Technical Manual*, 1993, (Full Text).

Advanced Micro Devices, *ISA–HUB™: User's Guide and Reference Manual*, 1993, (Full Text).

Advanced Micro Devices, *Managed IEEE 802.3 Repeaters: "MIB in a Chip"*, 1993, (Full Text).

*Primary Examiner*—Gary F. Paumen
*Attorney, Agent, or Firm*—Skjerven, Morrill, MacPherson, Franklin & Friel, LLP; Edward C. Kwok; Omkar K. Suryadevara

[57] ABSTRACT

A novel identity apparatus in the form of, for example, a cable or a system board has a number of connectors, each connector including one or more "identity" terminals, that are used to uniquely identify an electrical device attached to the connector. The identity apparatus eliminates jumpers or dip switches conventionally used in an electrical device to provide an identity to the electrical device. An identity cable's identity terminals are pulled up to reference voltage Vcc by the attached electrical device that also senses the voltage at the identity terminals to determine identity. The identity cable's connector includes a "ground" terminal that is coupled to ground by the attached electrical device. Each identity terminal of a cable is couplable (i.e. can be coupled) inside the identity cable to ground or alternatively left unconnected, to thereby indicate a logic state "1" or a logic state "0" respectively. A system board's identity terminals can be pulled up to Vcc or coupled to ground by traces within the system board, thereby eliminating any ground terminals or couplings to voltage sources in an attached electrical device that are needed by an identity cable.

33 Claims, 7 Drawing Sheets

APPARATUS AND METHOD TO UNIQUELY IDENTIFY SIMILARLY CONNECTED ELECTRICAL DEVICES

This application is a continuation of application Ser. No. 08/399,323, filed Mar. 6, 1995, now abandoned.

FIELD OF THE INVENTION

This invention generally relates to an apparatus and method to uniquely identify electrical devices. In particular this invention relates to an identity apparatus having one or more terminals that uniquely identify each one of a plurality of electrical devices that are coupled to the identity apparatus.

CROSS-REFERENCE TO APPENDIX A

Appendix A of 3 pages, incorporated herein by reference in its entirety, is a listing of the equations of a programmable array logic device included in an ISA hub card that is attached to an identity cable in accordance with this invention.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Ethernet over Unshielded Twisted Pair (UTP) cables based on the 10Base-T standard (as described in sections 13 and 14 of IEEE Standard 802.3i-1990—that is a supplement to ISO/IEC 8802-3:1990, Product Number SH16337 available from IEEE Service Center, 445 Hoes Lane, P.O. Box 1331, Piscataway, N.J., USA 08855-1331, and that is incorporated herein in its entirety), using hub cards (sometimes referred to as "concentrators" or "repeaters") in the center of a star-wired configuration is popular in modern offices. Use of UTP cables that can also be used in telephone systems provides flexibility to moves, changes and additions, without rewiring the modern office.

One example of prior art hub cards are ISA hub cards 101–103 (FIG. 1A) that contain a predetermined number of ports, such as Twisted Pair (TP) ports J4 (FIG. 1A), that support an ethernet with eight 10Base-T stations, for example, personal computers (PCs).

ISA hub cards 101–103 of FIG. 1A are 10Base-T Ethernet repeater cards, such as "ISA-HUB™-KT" available from Advanced Micro Devices, Inc. (AMD), One AMD Place, P.O. Box 3453, Sunnyvale, Calif. 94086, and described in ISA-HUB™ Users' Manual (also available from AMD), that is incorporated by reference herein in its entirety.

An ISA hub card, such as card 101, supports the physical topology of an Ethernet network, allowing two or more 10Base-T stations that are connected to connectors J4 to communicate with each other. When data is received on a single port of connector J4, ISA hub card 101 retransmits the received data to all other ports of connector J4, performing signal retiming and amplitude restoration. When data appears simultaneously on more than one port, ISA hub card 101 transmits a collision signal to all ports of connector J4, including ports of the transmitting and receiving 10Base-T stations.

ISA hub cards 101–103 can be supported by a single system board 110 to take advantage of shared costs, for example, of the power supply. Use of a single system board 110 offers easy expansion by allowing installation of additional hub cards (not shown). Although only three ISA hub cards are illustrated in FIG. 1A, up to eight ISA hub cards can be mounted on system board 110. Use of a single system board 110 also allows use of redundant power supplies, support for multiple LAN segments, support for different media access protocols, such as token ring and different media types such as UTP, coaxial cable and fiber optics.

An expansion interface comprising connectors J1 and J2 (FIG. 1A) in each ISA hub card 101–103 allows a number of ISA hub cards 101–103 to act in concert as a single aggregate ISA hub, thereby providing a single ethernet for an office that contains a larger number of PCs (e.g. 24 PCs) than the number of ports (e.g. 8 ports) on a single ISA hub card. In such a case, a connector, e.g. connector J1 of an ISA hub card is connected to a corresponding connector, e.g. connector J1, of another ISA hub card. Connection of multiple ISA hub cards is described in for example, "IEEE 802.3 Repeater, Technical Manual" available from AMD (above), and that is incorporated by reference herein in its entirety. ISA hub cards 101–103 are connected by conventional cables, such as cable 120 (FIG. 1B) that has straight through, e.g. one-to-one wiring 131–135 between a left connector 140 having terminals 141–145 and a right connector 150 having terminals 151–155.

Dip switches or jumpers can be included in electrical devices that are to be interconnected to allow a user to provide a unique identity to each electrical device. For example, jumpers JP1 (FIG. 1A) allow a user to uniquely identify each one of ISA hub cards 101–103. Any of ISA hub cards 101–103 can be configured to perform the master function by placing a single jumper in the "M" position as described in the ISA-HUB™ User's Manual referenced above. All ISA hub cards, other than a master ISA hub card, are slaves that are assigned unique identities by placing a single jumper at a unique position other than the M position as described in the ISA-HUB™ User's Manual (above).

The use of jumpers or dip switches to uniquely identify electrical devices, such as ISA hub cards 101–103 has several disadvantages. If two or more ISA hub cards 101–103 are erroneously left at the factory default settings for jumpers JP1, identity confusion results when ISA hub cards 101–103 are connected together in chassis 110. During such identity confusion each ISA hub card 101–103 left at the default setting of jumpers JP1 acts as a master hub card. Multiple master hub cards result in a system that does not function, for example, because two or more master ISA hub cards will drive the system clock. Such a system could damage one or more of the master hub cards. Therefore, ensuring that only one hub card acts as a master, for example by providing unique identities to each ISA hub card is a critical step in the assembly of an aggregate ISA hub. Conventional manual adjustment of dip switches or jumpers to provide unique identities adds to the assembly cost of such an aggregate ISA hub. Provision of jumpers on dip switches also adds to the manufacturing cost of an ISA hub card.

In a prior art ethernet, the master ISA hub card is also responsible for reset synchronization and for centralized arbitration. Centralized arbitration is performed by a programmable array logic (PAL) device of the master ISA hub card. Although a PAL device is included in every ISA hub card, only the PAL device in a master ISA hub card is enabled.

The master ISA hub card's PAL device (also called master arbitration PAL device) performs centralized arbitration by monitoring request signals on a number of request lines of cable 120. Each request signal originates from one of ISA hub cards 101–103 as follows. The PAL device of a ISA hub card that receives a packet from an ethernet node drives a request signal active and waits for an acknowledge signal to go active before transmitting the received packet to other ISA hub cards e.g. on cable 120.

The master arbitration PAL generates a collision signal that is transmitted on a collision line to all ISA hub cards 101–103 when more than one request line is active simultaneously. If only one request line has an active request signal, the master arbitration PAL generates an acknowledge signal that is also transmitted to all ISA hub cards 101–103. Only the ISA hub card that generated the active request signal responds to the active acknowledge signal and transmits a packet e.g. on cable 120. All other ISA hub cards wait to receive the packet in response to the active acknowledge signal.

Centralized arbitration requires that a slave ISA hub card 101–103 wait for the time required for a request signal to travel the expansion cable distance (e.g. distance D in FIG. 1A) between the slave ISA hub card and master ISA hub card and the time required for an acknowledge signal to travel back the expansion cable distance from the master ISA hub card, which wait imposes a limitation on the speed of the network (such as an ethernet). In one prior art ethernet, a slave ISA hub card waits for a travel time of 100 nanoseconds, which wait limits the prior art ethernet to a speed of 10 megahertz.

SUMMARY OF THE INVENTION

A novel identity apparatus in accordance with this invention includes a plurality of connectors (also called "identity" connectors) having one or more electrical terminals, also referred to as "identity terminals," that can uniquely identify one or more novel electrical devices attached to the identity apparatus. The identity apparatus indicates a unique identity to each attached electrical device through one or more identity terminals that are either at a first reference voltage, e.g. ground reference to indicate logic state "1" or at a second reference voltage, e.g. voltage Vcc reference to indicate logic state "0". An attached electrical device determines identity by sensing the voltage level at the identity terminals.

An identity apparatus that configures identity terminals external to the attached electrical device as described above has several advantages. During manufacture of the electrical devices, each electrical device can be manufactured identical to every other electrical device, and elimination of jumpers or dip switches results in reduced manufacturing cost of the electrical devices, as compared to prior art devices. Also, wiring of identity terminals in the identity apparatus can be done automatically so that any increase in cost due to such wiring is minimal.

One embodiment of the identity apparatus is symmetric and supports reversibility in the positioning of electrical devices with respect to each other. Therefore the identity apparatus is convenient and intuitive to use, without need for any forethought when attaching electrical devices to the identity apparatus.

An identity apparatus can have the form of a cable (also called identity cable) that includes a sheath that supports and insulates electrical conductors that interconnect various terminals between identity connectors of the identity cable. In two alternative embodiments, the sheath is a flexible ribbon or a rigid brace. An identity apparatus can also have the form of a number of identity connectors mounted on an inflexible structure, such as system board of a system chassis.

As an identity cable is a passive device (e.g. without any active components), an electrical device attached to the identity cable must couple each identity terminal through a pull-up resistor to a voltage source at, for example, second reference voltage of Vcc reference. The identity cable indicates logic state "0" when the identity terminal is left unconnected inside the cable. To indicate logic state "1", the identity cable has one or more conductive links that couple an identity terminal to a "ground terminal" that is at first reference voltage e.g. ground reference, and that is coupled by the attached electrical device to a ground reference source.

As a system board can couple each identity terminal to the ground reference or alternatively to a source of the Vcc reference independent of the attached electrical device, an attached electrical device needs to merely sense the signals at the identity terminals of the system board's identity connectors.

In one embodiment, the attached electrical devices are all Industry Standard Architecture (ISA) hub cards that are coupled to each other by an identity apparatus in the form of a flexible ribbon cable. A programmable logic device, such as a PAL device in each ISA hub card can be used to perform distributed arbitration. In another embodiment, a programmable logic device in the master ISA hub card performs centralized arbitration similar to that described above.

DETAILED DESCRIPTION

Figure 1A:
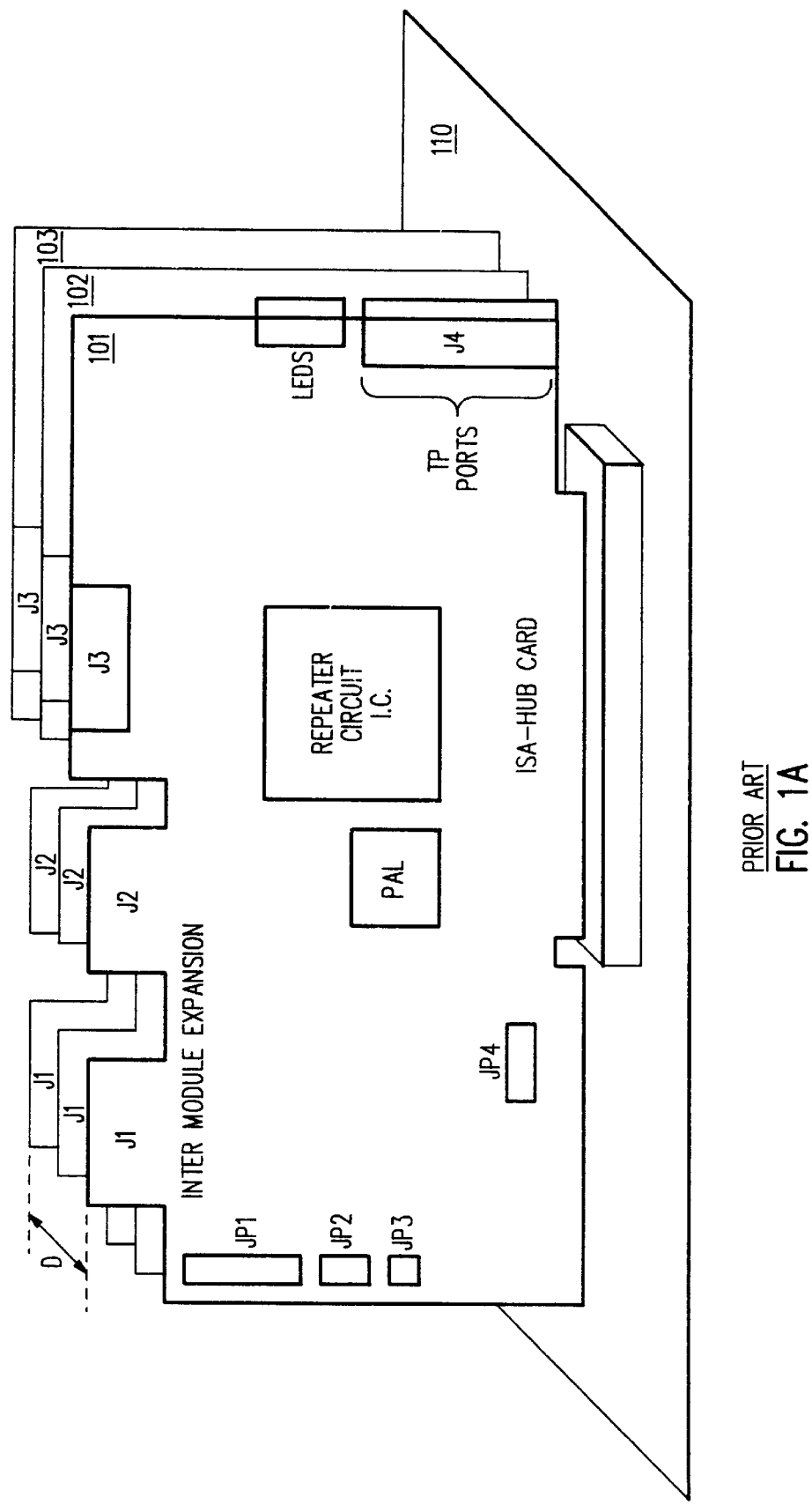
FIG. 1A illustrates three prior art ISA hub cards that are supported by a system board.
Figure 1B:
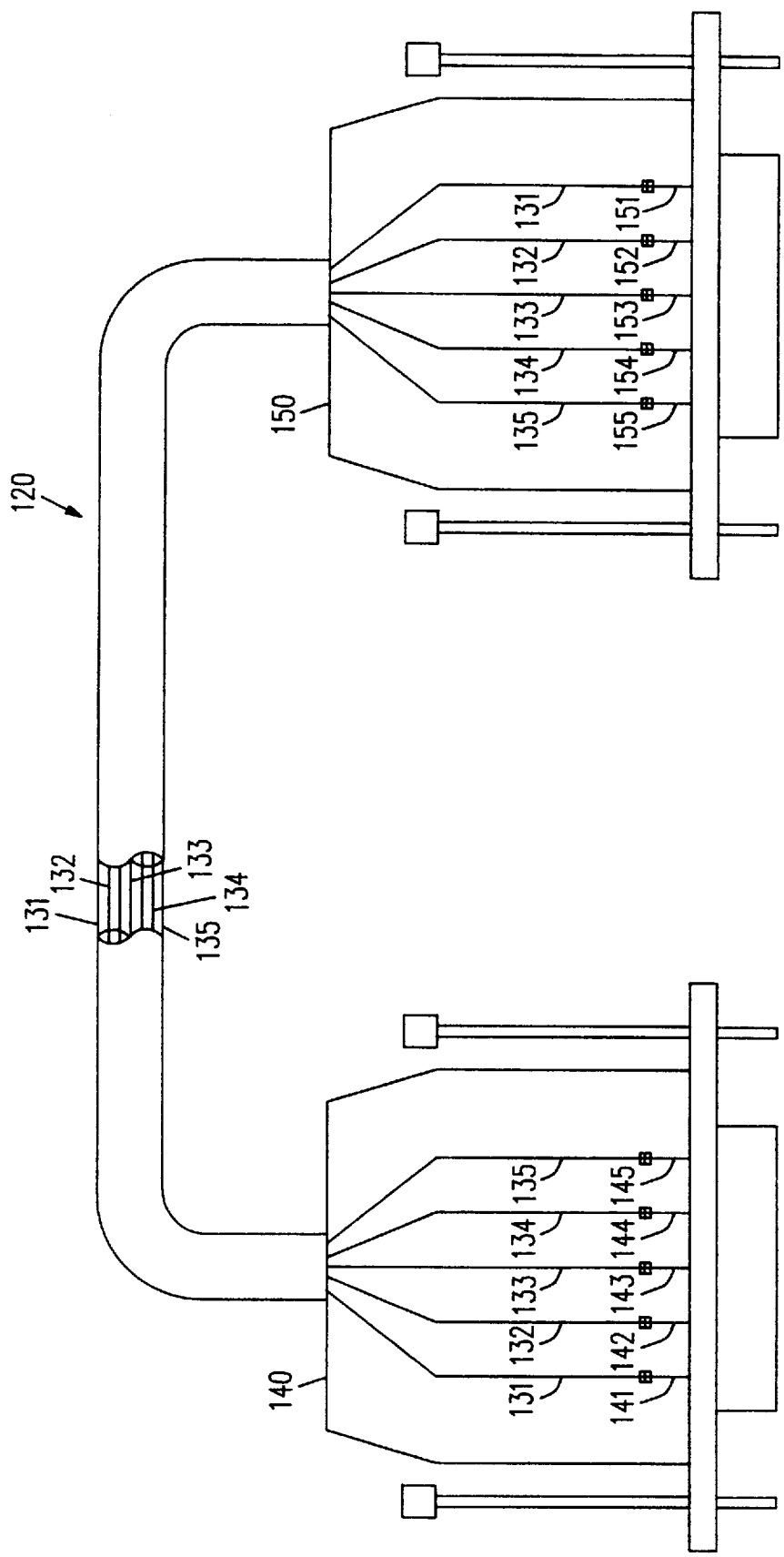
FIG. 1B illustrates a conventional cable that is used to interconnect two of the ISA hub cards illustrated in FIG. 1A.
Figure 1C:
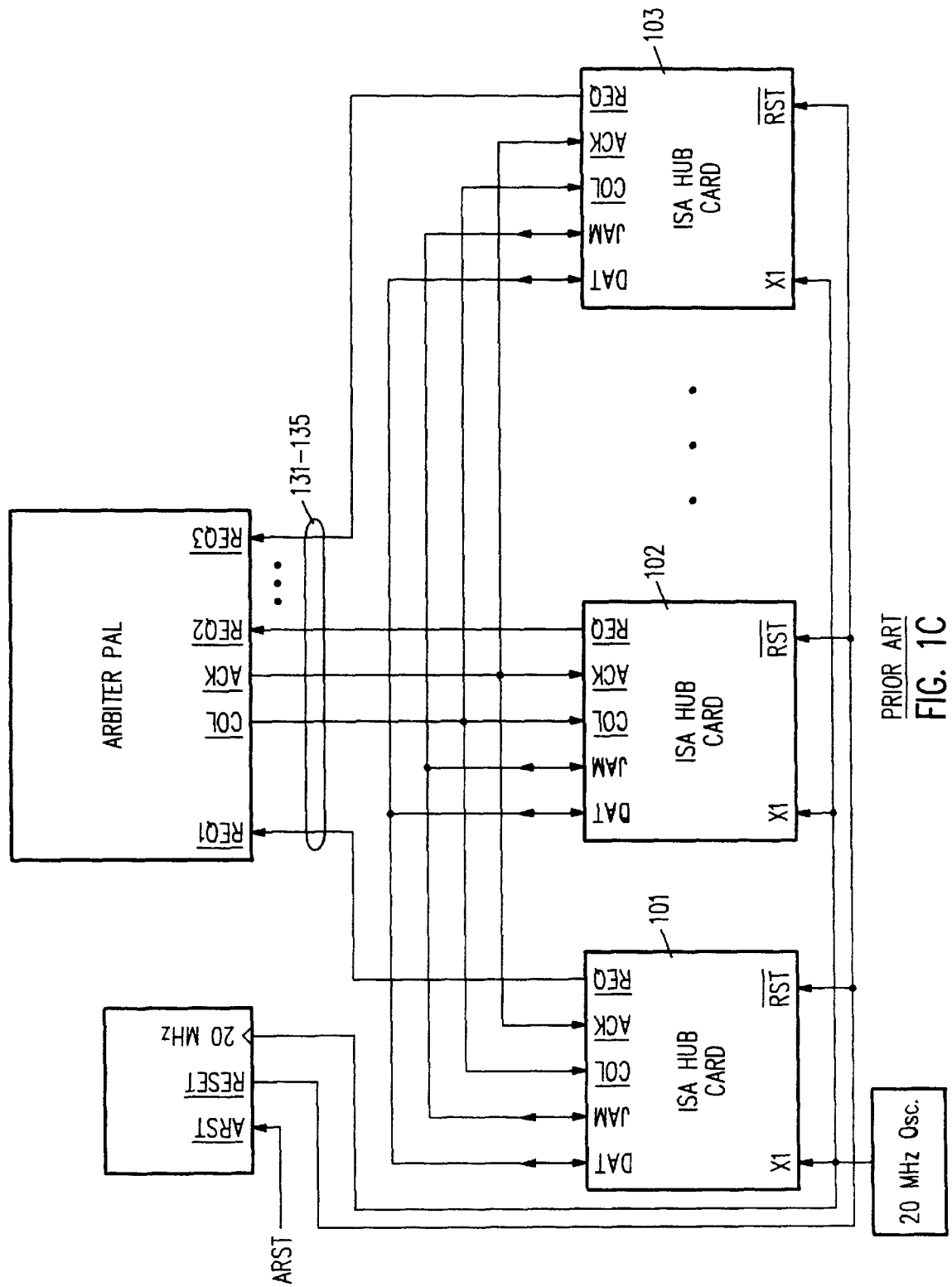
FIG. 1C illustrates in block diagram the interconnection of the ISA hub cards of FIG. 1A by cables of the type illustrated in FIG. 1B.
Figure 2A:
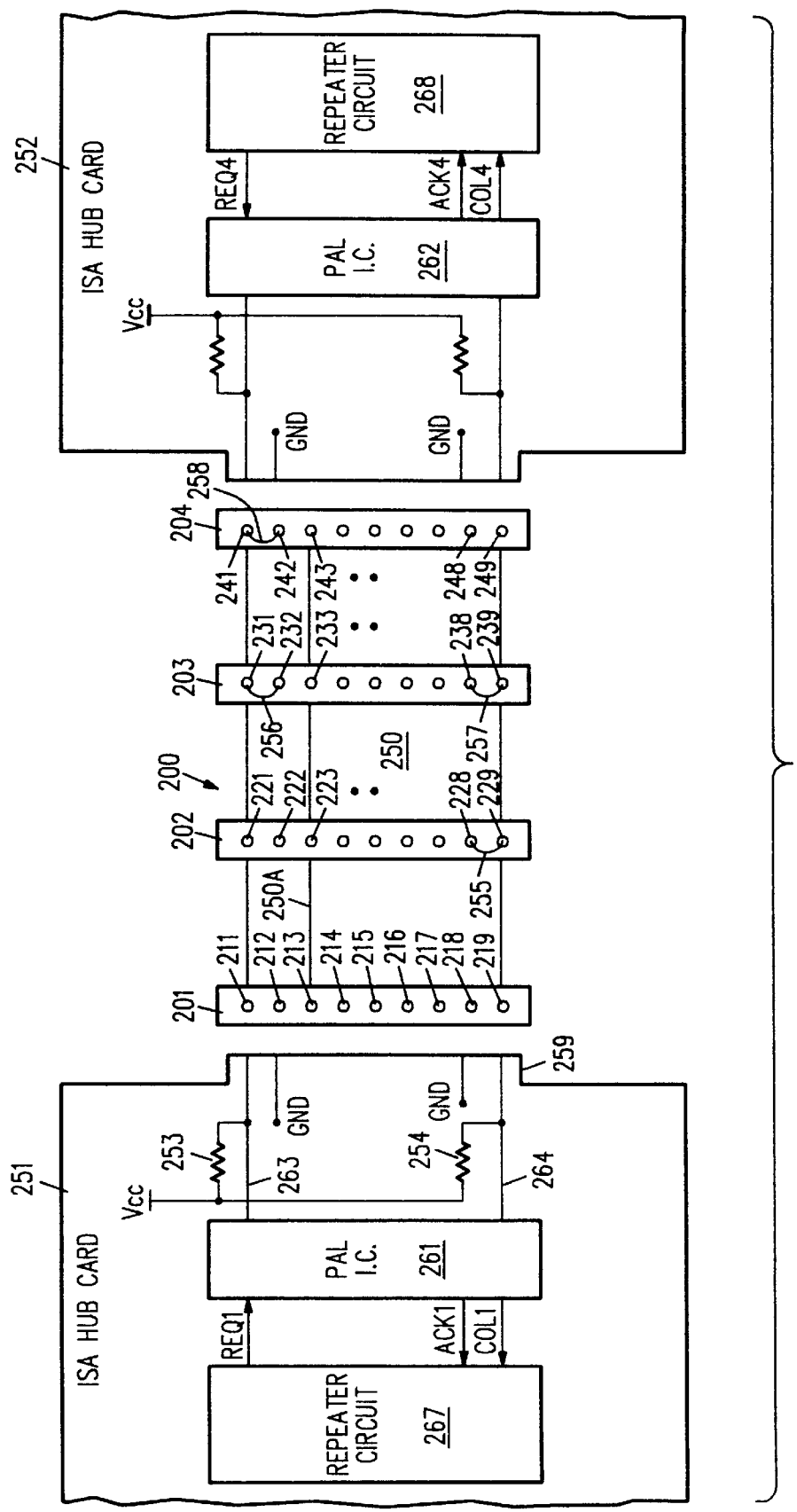
FIG. 2A illustrates one embodiment of a novel identity cable that can interconnect and provide identity to a plurality of electrical devices.

One embodiment of a novel identity apparatus that uniquely identifies an electrical device attached to the identity apparatus has the form of a cable, such as identity cable 200 (FIG. 2A).

Identity cable (also called simply "cable") 200 includes a first cable connector 201 located at a left end of cable 200, a second cable connector 202 located next to first cable connector 201, a third cable connector 203 located next to second cable connector 202 and a fourth cable connector 204 located at a right end of cable 200.

Each of cable connectors 201–204 includes a group of terminals 211–219, 221–229, 231–239 and 241–249 respectively. Cable 200 also includes a sheath 250 that supports and insulates electrical conductors, e.g. conductor 250A that interconnect various terminals between connectors of the identity cable. In two alternative embodiments, sheath 250 is a flexible ribbon or a rigid brace.

Figure 2B:
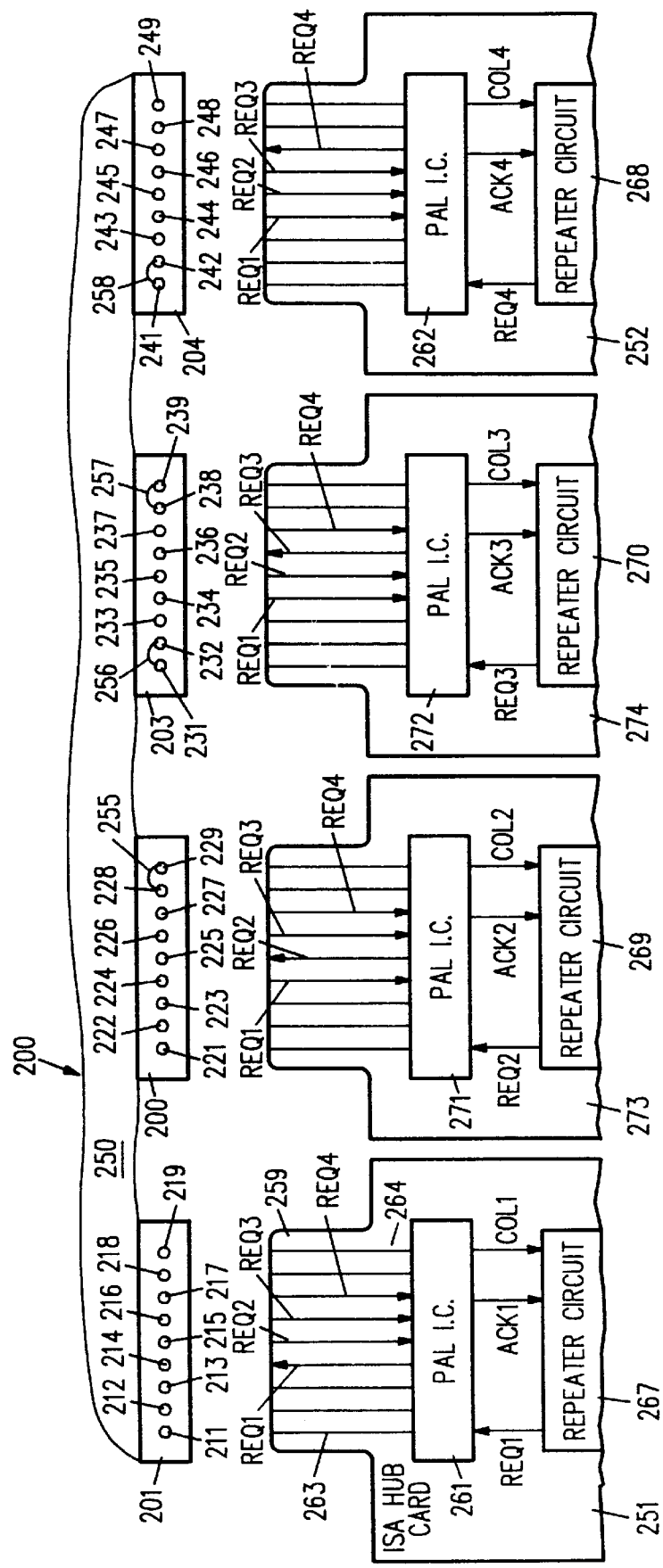
FIG. 2B illustrates the use of identity cable of FIG. 2A with four ISA hub cards in one embodiment of this invention.

Connectors 201–204 are suitable for coupling to terminals of an electrical device, such as one of ISA hub cards 251 and 252. Although only two ISA hub cards 251 and 252 are illustrated in FIG. 2A, a total of four electrical devices can be interconnected by cable 200, as illustrated in FIG. 2B.

In the embodiment illustrated in FIG. 2A, two terminals of each cable connector, such as terminals 211 and 219 of cable connector 201, are "identity terminals" that can uniquely identify an electrical device attached to cable 200, such as one of ISA hub cards 251–252. The attached electrical device, e.g. ISA hub card 251 couples identity terminals 211 and 219 through pullup resistors 253 and 254 respectively to a voltage source, at for example, the Vcc reference (FIG. 2A). In one specific embodiment, each pullup resistor has 1000 Ω resistance. In the embodiment of FIG. 2A, each cable connector also includes two terminals, such as terminals 212 and 218 of cable connector 201, that are "ground terminals" coupled by the attached electrical device, e.g. ISA hub card 251, to a ground reference source.

Cable 200 provides a unique identity to two or more attached electrical devices as follows. Each cable connector can include one or more conductive links such as wires that couple an identity terminal to a ground terminal, for example, to indicate logic state "1". Alternatively an identity terminal is left unconnected inside cable 200, for example, to indicate logic state "0".

In the embodiment of FIG. 2A, identity terminals 211 and 219 are left unconnected so that cable connector 201 can indicate the identity "00". Identity terminal 221 is left unconnected while identity terminal 229 is connected to ground terminal 228 by a short conductive link 255, so that cable connector 202 can indicate the identity "01". Identity terminals 231 and 239 are connected by conductive links 256 and 257 to ground terminals 232 and 238 respectively so that cable connector 203 can indicate the identity "11". Finally, identity terminal 241 is connected by conductive link 258 to ground terminal 242, while identity terminal 249 is left unconnected so that cable connector 204 can indicate the identity "10".

The rest of the terminals in cable 200 that carry conventional signals are connected with straight through wiring in the conventional manner, for example, wire 250A connects terminals 213, 223, 233 and 243. For clarity, not all wires of cable 200 are shown in FIGS. 2A and 2B.

Such an identity cable 200 eliminates the hub card's jumpers or dip switches that were needed in prior art ISA hub cards 101–103 (above) to indicate identity. Cable 200 can provide unique identities to each attached electrical device, irrespective of the specific position of the electrical device with respect to cable 200, even if the electrical devices are all identical to each other.

In one embodiment, identity conductors are located at the outer edges (FIG. 2A) of identity cable 200, to assure stable impedance characteristics for identity cable 200.

If there is a "master-slave" relationship wherein one electrical device is a master and all other electrical devices are slaves, then one electrical device must be connected to the specific connector that indicates master identity, while other electrical devices can be connected to any other connector of cable 200. For example, when cable 200 is used with ISA hub cards, one ISA hub card must be connected to the cable connector that indicates the identity "00", such as cable connector 201, so that the aggregate ISA hub formed by cable 200 has one (and only one) master. Use of the specific identity "00" for a master has the advantage that in an ISA hub with only one ISA hub card, e.g. card 251, the connector, e.g. connector 259, can be left unconnected and yet the ISA hub has an ISA hub card, e.g. card 251, with master identity "00".

The function of sensing identity in an attached electrical device can be implemented in a programmable logic device (PLD) such as one of PAL devices 261 and 262 of ISA hub cards 251 and 252 respectively. Each one of PAL devices 261 and 262 is similar to PAL devices of a prior art ISA hub card. Equations for a PAL device in an ISA hub card for use with one embodiment of an identity cable are listed in Appendix A.

Each one of ISA hub cards 251 and 252 that is attached to cable 200 has a number of identity lines, such as identity lines 263 and 264, that are coupled to identity terminals, such as identity terminals 211 and 219, when the electrical device is attached to an identity connector. Each one of PAL devices 261 and 262 senses the voltage level (and hence the logic state) of the signals on the identity lines to determine the identity of ISA hub cards 251 and 252 respectively. When connectors 201 and 204 are coupled to ISA hub cards 251 and 252 respectively, ISA hub card 251 senses identity "00" and acts as master while the other ISA hub card 252 senses the identity "10" and acts as a slave. As noted above, the connections of connectors 201 and 204 and cards 251 and 252 can be reversed without any loss of functionality.

In one embodiment, PAL devices 261 and 262 implement a novel distributed arbitration method in which collision and acknowledge signals are generated by each PAL device and supplied to a repeater circuit that is directly connected to the PAL device within a ISA hub card. When a repeater circuit, such as repeater circuit 267 needs to transmit a packet on cable 200, the repeater circuit drives a request signal active on one of the wires of cable 200. Each PAL device, such as PAL device 261 of ISA hub card 251 monitors request signals on request lines REQ1–REQ4 (FIG. 2B) from all repeater circuits (e.g. repeater circuits 267–270) that are connected by cable 200. Each PAL device (e.g. PAL device 26) receives a request signal from a local repeater circuit (e.g. repeater circuit 267) on a line (e.g. line REQ1) of the ISA hub card (e.g. card 251). Each PAL device (e.g. PAL device 261) also receives request signals from remote repeater circuits (e.g. circuit 268) through wires (not shown) of cable 200.

Each one of PAL devices 261, 262, 271 and 272 determines the occurrence of a collision, if more than one request signal, e.g. on request lines REQ1–REQ4, is active simultaneously, and then drives a collision signal, e.g. on each of collision lines COL1–COL4 active to the respective local repeater circuit e.g. each of repeater circuits 267–270. If only one request signal is active at a given time, all PAL devices receive the active request signal on e.g. request line REQ1, and each of PAL devices 261, 262, 271 and 272 drives an acknowledge signal e.g. on acknowledge line ACK1 active to the respective local repeater circuit, e.g. repeater circuits 267–270.

The novel distributed arbitration method described above has several advantages. The distributed arbitration scheme is faster because a repeater circuit, such as repeater circuit 267, receives an acknowledge signal on acknowledge line ACK1 or a collision signal on collision line COL1 from a PAL device that is locally connected to the repeater circuit, such as PAL device 265, rather than from a remote arbiter device, as was necessary in the prior art. Therefore, the expansion cable distance of cable 200 is a less critical dimension for implementing distributed arbitration than for centralized arbitration. For example, an aggregate ISA hub formed of ISA hub cards 251–252 and 273–274 that are connected by an identity cable of the same length as the prior art expansion cable distance can run at twice the prior art speed, because a repeater circuit, e.g. one of circuits 267–270 is only limited by the travel time of a single expansion cable distance (for the request signal).

The distributed arbitration method described above requires a smaller number of straight-through wires in cable 200, as compared to the prior art because the acknowledge signal and the collision signal are no longer transmitted over cable 200, although the request signal from a repeater circuit of a master ISA hub card is transmitted on cable 200. The master repeater circuit's request signal, e.g. on request line REQ1 allows slave ISA hub cards, e.g. cards 252, 273 and 274 to arbitrate in parallel with the master ISA hub card, e.g. card 251. For example, in the embodiment illustrated in FIG. 2A, identity cable 200 has four request lines 213–217, as compared to prior art cable 120 that has only three request lines 133, 134 and 135 but also has two lines 132 and 133 for acknowledge and collision signals.

Although a novel distributed arbitration method is described above for use in ISA hub cards connected by an identity cable, the novel identity apparatus can be used with other arbitration methods. For example, a prior art centralized arbitration method can be implemented in ISA hub cards that sense identities from an identity cable. Moreover, the novel distributed arbitration method can be used in ISA hub cards with prior art identity mechanisms, such as manually configured jumpers or dip-switches.

Although specific connections between ISA hub cards 251–252 and cable 200 are illustrated in FIG. 2A, other connections are also possible. For example, connector 259 of ISA hub card 251 can be connected to fourth cable connector 204 while connector 256 of ISA hub card 252 is connected to first cable connector 201. Since ISA hub cards 251 and 252 are identical to each other, such a connection, that is reverse of the connection shown in FIG. 2A, still results in the same functionality. Similarly connecting first connector 201 to ISA hub card 251 and second connector 202 to ISA hub card 252 results in the same functionality.

An even number of identity terminals (e.g. two identity terminals) provides symmetry to cable 200 that permits reversibility (e.g. cable 200 providing identities "01", "00", "11" and "10" can be spatially reversed with respect to the electrical device to provide identities "10", "11", "00" and "01"), without loss of uniqueness of identity. When multiple hub cards are interconnected by cable 200, the specific identity of each hub card is irrelevant as long as there is only one master hub card and all other hub cards have identities unique with respect to each other.

Numerous variations in identity order can cover the entire permutation of possible identities indicated by an identity cable. For example, in a variation of the embodiment of cable 200 described above, identity terminals 221, 229 and 211 can be left unconnected while terminal 219 is connected to ground terminal 218, so that cable connector 202 indicates the identity "00" and cable connector 201 indicates the identity "01." Other identities "10" and "11" can also be indicated by cable connector 202 by appropriate coupling of identity terminals to the ground reference source. The range of possible identities can be expanded by increasing the number of identity terminals in an identity apparatus, for example from 2 identity terminals (four identities) to 4 identity terminals (sixteen identities). Other numbers of identity terminals are also possible.

Figure 3A:
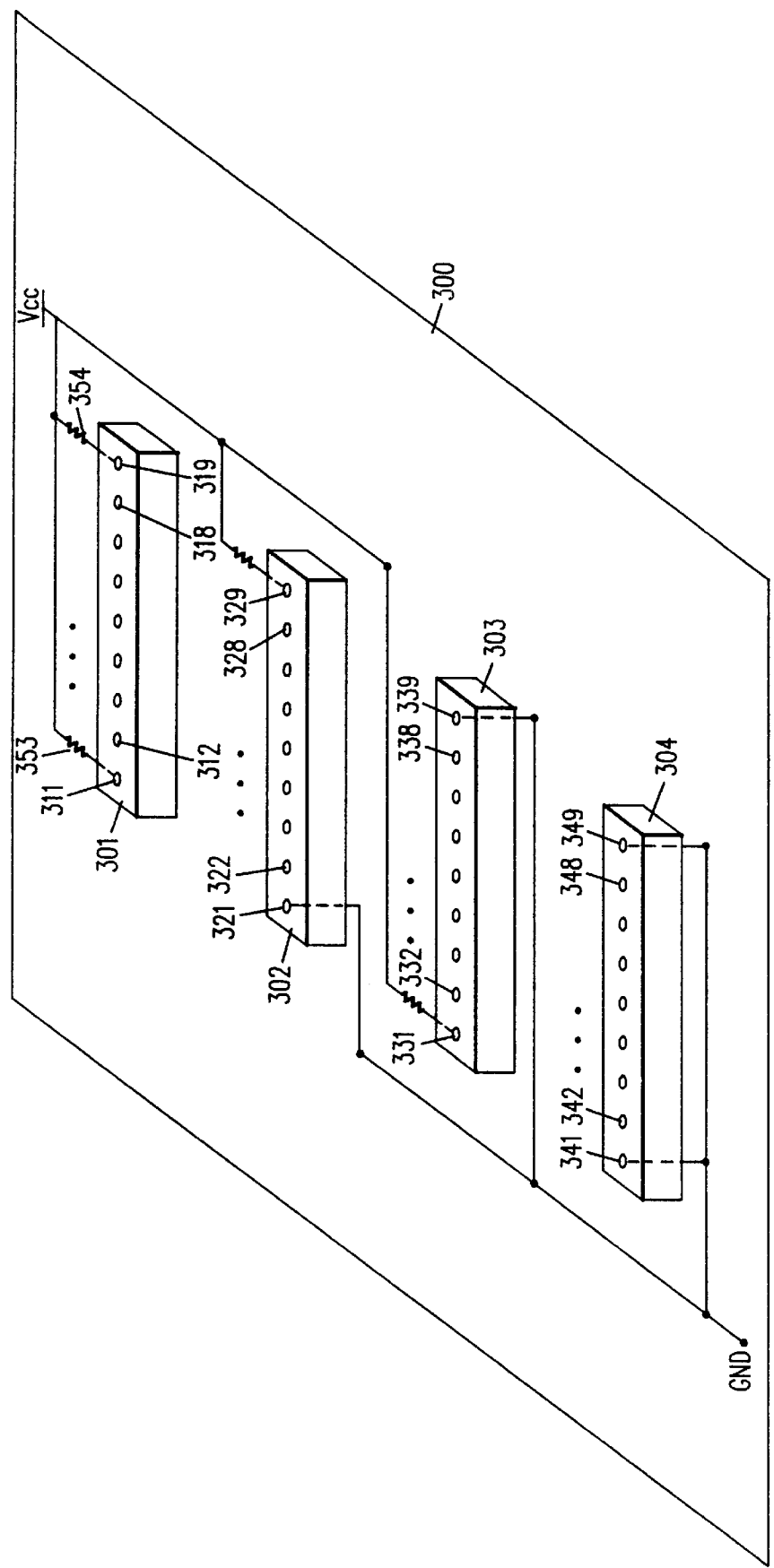
FIG. 3A illustrates a system board for interconnecting four ISA hub cards in another embodiment of this invention.

Although wires 241 and 242 are used in one embodiment as conductive links to couple the identity terminals and the ground terminals, other electrical couplings can also be used, and an identity apparatus can have a form other than a cable. In one embodiment, an inflexible structure, such as system board 300 (FIG. 3A) rigidly supports a number of identity connectors 301–304 that are similar to identity connectors 201–204 (FIG. 2A) except as described below. Connectors 301–304 (FIG. 3A) do not have ground terminals, such as ground terminals 212 and 218 (FIG. 2A). Instead, terminals 312 and 318 are connected straight through by traces (not shown) in system board 300 to terminals 322, 332 and 342 and to 328, 338 and 348 respectively and are used for signal transmission between ISA hub boards (not shown) attached to identity connectors 301–304. Identity terminals, such as terminals 311 and 319 (FIG. 3A) of connector 301 are connected inside system board 300 to the ground reference source or pulled up through pull-up resistors, e.g. resistors 353–354 to the Vcc reference, as necessary to indicate an identity.

Figure 3B:
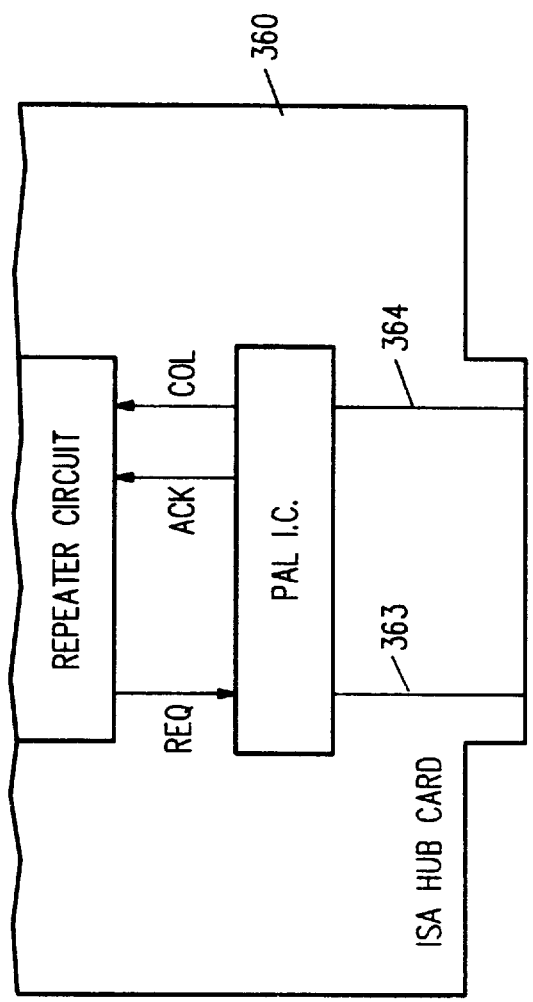
FIG. 3B illustrates an ISA hub card for use with the system board of FIG. 3A.

For use with system board 300, an attached electrical device e.g. ISA hub card 360 (FIG. 3B) does not provide connections to a source of the ground reference or of the Vcc reference as described above for ISA hub cards 251 and 252. However, each attached electrical device e.g. ISA hub card 360 senses the voltage on the identity lines e.g. lines 363 and 364, in the manner described above e.g. for lines 263 and 264 of ISA hub card 251.

An identity apparatus e.g. cable 200 or system board 300 that is external to an electrical device to be identified, as described above, has several advantages. Each of the electrical devices is identical to every other electrical device, resulting in elimination of jumpers (or dip switches) and thus reducing the electrical device's fabrication cost. Moreover, the cost of assembling an aggregate ISA hub that includes a number of ISA hub cards is reduced, due to elimination of the error-prone, laborious step of setting jumpers or dip switches. Use of identity cable 200 or system board 300 eases assembly of such an aggregate ISA hub.

Numerous other advantages of an identity apparatus will be obvious to those skilled in the art of "plug and play", based on the enclosed disclosure. For example, as minimal forethought is needed for connecting an identity apparatus to an electrical device, this invention results in time saving during assembly. Also, reversibility of the identity apparatus results in idiot-proof assembly.

Numerous modifications and adaptations of the invention will be obvious in view of the enclosed disclosure. For example, a system board can contain only traces that connect identity terminals to a ground reference source (as described in reference to FIG. 3A), while the identity terminals are coupled by pullup resistors in the attached electrical devices to a voltage source (as described in reference to FIG. 2A).

Although negative logic state are illustrated in the above description, wherein the Vcc reference indicates logic state "0" and the ground reference indicates logic state "1", positive logic states with logic states reverse of the negative logic states can also be used.

Various modifications and adaptations of the embodiments described above are encompassed by the attached claims.

APPENDIX A

```
MODULE    ISAHUB1
TITLE     'ISAHUB1.ABL, Rev. 1.0, 10/02/94'
DECLARATIONS
ISAHUB1    device 'MACH110A';
"IMR+ Signals"
SO         PIN    30;
STR        PIN    35;
!REQ       PIN    32;
X1         PIN    14     istype 'Com,Buffer';
TEST       PIN     9     istype 'Com,Buffer';
JAM        PIN    21     istype 'Com,Buffer';
DAT        PIN    20     istype 'Com,Buffer';
!ACK       PIN    15     istype 'Com,Invert';
!COL       PIN     6     istype 'Com,Invert';
!RST       PIN     2     istype 'Reg,Invert';
SI         PIN     5     istype 'Reg,Buffer';
"Expansion Interface Signals"
!S1        PIN    10;
!S0        PIN    11;
XCLK       PIN     8     istype 'Com,Buffer';
BJAM       PIN    18     istype 'Com,Buffer';
BDAT       PIN    19     istype 'Com,Buffer';
!REQ3      PIN    24     istype 'Com,Invert';
!REQ2      PIN    27     istype 'Com,Invert';
!REQ1      PIN     3     istype 'Com,Invert';
!REQ0      PIN     4     istype 'Com,Invert';
!INIT      PIN     7     istype 'Reg,Invert';
"LED Interface Signals"
TCLK       PIN    16     istype 'Reg,Buffer';
!LED5      PIN    38     istype 'Reg,Invert';
!LED4      PIN    39     istype 'Reg,Invert';
!LED3      PIN    40     istype 'Reg,Invert';
!LED2      PIN    41     istype 'Reg,Invert';
!LED1      PIN    42     istype 'Reg,Invert';
!LED0      PIN    43     istype 'Reg,Invert';
TP7        NODE          istype 'Reg,Buffer';
TP6        NODE          istype 'Reg,Buffer';
TP5        NODE          istype 'Reg,Buffer';
TP4        NODE          istype 'Reg,Buffer';
TP3        NODE          istype 'Reg,Buffer';
TP2        NODE          istype 'Reg,Buffer';
TP1        NODE          istype 'Reg,Buffer';
TP0        NODE          istype 'Reg,Buffer';
"Misc. Signals"
CLK        PIN    13;
OSC20MHZ   PIN    33;
RESETDRV   PIN    17;
INITX      NODE;
"Vectors"
TP70       = [TP7..TP0]
TP71       = [TP7..TP1]
TP60       = [TP6..TP0]
TP50       = [TP5..TP0]
LED        = [LED5..LED0];
REQ30      = [REQ3..REQ0];
EQUATIONS
"IMR+ Interface Logic"
X1         = XCLK;
RST        := INIT;
TEST       = RST.d;
SI         := RST.d # SI.d & !TP3;
COL        = !ACK.fb & (REQ3 # REQ2 # REQ1 # REQ0);
ACK        = REQ3 & !REQ2 & !REQ1 & !REQ0
           # !REQ3 &  REQ2 & !REQ1 & !REQ0
           # !REQ3 & !REQ2 &  REQ1 & !REQ0
           # !REQ3 & !REQ2 & !REQ1 &  REQ0;
JAM        = BJAM;
DAT        = BDAT;
"Expansion Interface Logic"
XCLK       = OSC20MHZ;
INITX      := RESETDRV;
INIT       := INITX;
REQ30      = REQ;
BJAM       = JAM;
BDAT       = DAT;
"LED Interface Logic"
TCLK       := !RST.d & !TCLK.d;
```

APPENDIX A -continued

```
TP7        := !RST.d & (SI.d # !TCLK.d & SO # TCLK.d & TP7);
TP60       := !RST.d & (!TCLK.d & TP71 # TCLK.d & TP60);
LED        := !RST.d & (!TCLK.d & STR & TP50 # !(!TCLK.d & STR) & LED.d);
"TRISTATES"
REQ3.oe    = !S1 & !S0;
REQ2.oe    = !S1 &  S0;
REQ1.oe    =  S1 & !S0;
REQ0.oe    =  S1 &  S0;
INIT.oe    =  S1 &  S0;
XCLK.oe    =  S1 &  S0;
BJAM.oe    =  ACK.fb & REQ;
BDAT.oe    =  ACK.fb & REQ;
JAM.oe     = !REQ;
DAT.oe     = !REQ;
"CLOCK SETTINGS"
RST.clk    = CLK;
SI.clk     = CLK;
INITX.clk  = CLK;
INIT.clk   = CLK;
TCLK.clk   = CLK;
TP70.clk   = CLK;
LED.clk    = CLK;
END
```

I claim:

1. An identity cable assembly comprising:
a sheath enclosing a plurality of electrical conductors;
a pair of conductive links; and
a plurality of connectors supported by the sheath, said plurality of connectors including a first connector having terminals identified as A1, A2, through As, and a second connector having terminals identified as B1, B2, through Bs;
wherein:
i, j, m and n are numbers in the range 1–s:
in said first connector a first pair of terminals (Ai, Aj) are unbreakably coupled to each other by one of the conductive links and a second pair of terminals (Am, An) are permanently uncoupled from each other;
in said second connector, a second pair of terminals (Bm, Bn) are unbreakably coupled to each other by another of the conductive links and a first pair of terminals (Bi, Bj) are permanently uncoupled from each other; and wherein a plurality of the terminals of each connector are interconnected to a plurality of the terminals of at least one other said connector by the electrical conductors.

2. The identity cable assembly of claim 1 wherein the conductive link is enclosed in the sheath.

3. The identity cable assembly of claim 1 further comprising an electrical conductor, wherein:
a terminal Ak in the first connector, a terminal Bk in the second connector are coupled to each other by the electrical conductor; and
k is a number in the range 1–s and other than one of the numbers i, j, m and n.

4. The identity cable assembly of claim 1 wherein the terminal Ai is adjacent to an outer edge of the connector, and the terminal Ai is located adjacent to the terminal Ai.

5. The identity apparatus of claim 1 wherein the conductive link is a wire.

6. The identity cable assembly of claim 1 wherein said sheath includes a flexible ribbon.

7. The identity cable assembly of claim 1 wherein said identity cable is devoid of an active component.

8. The identity cable assembly of claim 1 wherein the first pair of terminals Ai and Aj are located adjacent to each other, the second pair of terminals Am and An are located adjacent to each other, and the first pair of terminals Ai and Aj are located opposite to the second pair of terminals Am and An.

9. The identity cable assembly of claim 1 wherein i=1, j=2, m=s−1 and n=s.

10. The identity cable assembly of claim 1 further comprising a third connector having terminals identified as C1, C2, through Cs, wherein each pair of terminals (Ci, Cj) and (Cm, Cn) are permanently uncoupled from each other.

11. The identity cable assembly of claim 10 further comprising an electrical conductor coupled between a terminal Ck in the third connector and one of terminals Ak and Bk, wherein k is a number in the range 1–s.

12. The identity cable of claim 1 further coming a third connector having terminals identified as C1, C2, through Cs, wherein each pair of terminals (Ci, Cj) and (Cm, Cn) are unbreakably coupled to each other.

13. An identity apparatus comprising:
   a structure having a plurality of electrical conductors;
   a plurality of conductive links; and
   a plurality of connectors supported by the structure, each connector comprising a plurality of identity terminals, wherein:
      a first pair of identity terminals numbered i and j are located at a first pair of predetermined locations relative to the structure;
      a second pair of identity terminals numbered m and n are located at a second pair of predetermined locations relative to the structure; and
   in first one of the connectors, one of the conductive a link unbreakably couples identity terminals i and j of the first pair to each other and the second pair of terminals m and n are permanently uncoupled;
   in a second one of the connectors, another one of the conductive links unbreakably couples identity terminals m and n of the second pair to each other and the first pair of terminals i and j are permanently uncoupled from each other; and
   wherein a plurality of the terminals of each connector are interconnected to a plurality of the terminals of at least one other said connector by the electrical conductors.

14. The identity apparatus of claim 13 wherein each unique combination of signals on identity terminals in the first pair indicates a unique identity.

15. The identity apparatus of claim 13 wherein each electrical conductor is a wire, and the structure includes a flexible tubular sheath surrounding said wires.

16. The identity apparatus of claim 13 wherein said structure is an inflexible system board and at least one apparatus terminal of each said connector is connected to a voltage source in said system board.

17. The apparatus of claim 13 wherein said first voltage level is the ground reference.

18. The apparatus of claim 17 wherein said second voltage level is the Vcc reference.

19. The identity apparatus of claim 13 wherein each of the conductive links is enclosed in the housing.

20. The identity apparatus of claim 13 further comprising a plurality of electrical conductors, wherein a group of signal terminals in each connector are unbreakably coupled by the plurality of electrical conductors to a corresponding group of signal terminals in another connector.

21. The identity apparatus of claim 13 wherein each first predetermined location is adjacent to an edge of the connector and each second predetermined location is adjacent to a first predetermined location.

22. The identity apparatus of claim 13 wherein the number of identity terminals is even.

23. The identity apparatus of claim 13 wherein each conductive link is a wire.

24. The identity apparatus of claim 13, wherein the coupled identity terminals in the first connector are located symmetric with respect to coupled identity terminals in the second connector.

25. The identity apparatus of claim 13 wherein said structure includes a rigid brace.

26. An identity cable assembly having a left end and a right end, the cable assembly comprising:
   a plurality of conductive links;
   a first cable connector located at the left end, the first cable connector having a first group G1 of signal terminals labeled As1, As2, through Asn;
   a second cable connector located adjacent to the first cable connector, the second cable connector having a pair of identity terminals labeled Bi1 and Bi2, said identity terminals Bi1 and Bi2 being unbreakably coupled to each other by one of the conductive links, the second cable connector having a second group G2 of signal terminals labeled Bs1, Bs2, through Bsn;
   a third cable connector located adjacent to the second cable connector, the third cable connector having a pair of identity terminals labeled Ci1 and Ci2, said identity terminals Ci1 and Ci2 being unbreakably coupled to each other by another of the conductive links, said identity terminals Ci1 and Ci2 being located opposite to the location of said identity terminals Bi1 and Bi2, the third cable connector having a third group G3 of signal terminals labeled Cs1, Cs2, through Csn;
   a fourth cable connector located at the right end, the fourth cable connector having a fourth group G4 of signal terminals labeled Ds1, Ds2, through Dsn; and
   a plurality of electrical conductors, each electrical conductor being flexible, each electrical conductor being insulated from the other electrical conductors, each electrical conductor being connected between a signal terminal in one of the groups G1–G4 to a signal terminal in another of the groups G1–G4;
   wherein a selected one of the first cable connector and the fourth cable connector has a pair of identity terminals unbreakably coupled to each other by yet another of the conductive links, and one of the selected cable connector, the second cable connector and the third cable connector has another pair of identity terminals unbreakably coupled to each other by still another of the conductive links.

27. The identity cable assembly of claim 26 wherein a first identity terminal in each pair of unbreakably coupled identity terminals is coupled to a first voltage source through a resistor, and a second identity terminal in each pair is coupled to a second voltage source.

28. An identity apparatus comprising:
   a plurality of connector means for connection to a plurality of electrical devices, each connector means having a plurality of signal means for carrying electrical signals and a plurality of identity means for indicating an identity of the connector means, the plurality of identity means in each connector means being labeled with numbers 1–s such that an identity means labeled k in a connector means is located at the same position as another identity means labeled k in another connector means;

a plurality of conductive means for unbreakably coupling two of said identity means to one another; and means for supporting the plurality of connector means, said supporting means having a plurality of electrical conductors;

wherein a first pair of identity means labeled i and j in a first connector are unbreakably coupled by a conductive means to each other and a second pair of identity means labeled m and n in a second connector are unbreakably coupled by another conductive means to each other, said i, j, k, m and n being in the range 1–s; and wherein a plurality of the terminals of each connector means are interconnected to a plurality of the terminals of at least one other said connector means by the electrical conductors.

29. The identity apparatus of claim 28, wherein identity means in the first pair are located adjacent to each other and identity means in the second pair are located adjacent to each other.

30. A method of making an identity apparatus having a plurality of connectors, said method comprising:

supporting a plurality of terminals labeled 1, 2, through s in each connector such that the location of a terminal labeled i in one of the connectors is identical to the location of another terminal labeled i in another one of the connectors;

unbreakably coupling inside a first one of the connectors, a terminal labeled i to a terminal labeled k so that a signal supplied to the terminal labeled j is conveyed to the terminal labeled k thereby to indicate a first identity;

unbreakably coupling inside a second one of the connectors, a terminal labeled m to a terminal labeled n so that a signal supplied to the terminal labeled m is conveyed to the terminal labeled n thereby to indicate a second identity different from said first identity, said i, j, k, m and n being in the range 1–s; and electrically connecting a plurality of the terminals of the first connector to a plurality of the terminals of the second connector by a plurality of electrical conductors.

31. A method comprising the steps of claim 30 followed by:

coupling said apparatus to said electrical device; and supplying said signal to said first right terminal.

32. The method of claim 30 wherein in each connector, a first location of one of said unbreakably coupled terminals is adjacent to an edge of the connector, and a second location of the other of said unbreakably coupled terminals is adjacent to the first location.

33. The method of claim 30 further comprising:

unbreakably coupling a plurality of identity terminals in the first connector to a corresponding plurality of identity terminals in the second connector using a plurality of electrical conductors; and enclosing the electrical conductors in a housing.

* * * * *

UNITED STATES PATENT AND TRADEMARK OFFICE
CERTIFICATE OF CORRECTION

PATENT NO. : 5,836,785
DATED : November 17, 1998
INVENTOR(S) : Sherman Lee

It is certified that error appears in the above-indentified patent and that said Letters Patent is hereby corrected as shown below:

Column 10, line 61, delete "Ai" and insert --Aj--;
Column 11, line 33, delete "a link" and add --links-- after "conductive";
Column 11, line 60, delete "in the housing" and insert --in the structure--;
Column 13, line 30, delete "i" and insert --j-- after "labelled";
Column 14, line 15, insert --identity -- before "apparatus";
Column 14, line 15, delete "said" in the second occurrence and insert --an--; and
Column 14, line 16, delete "first right terminal" and add --terminal labeled j--.

Signed and Sealed this

Twenty-seventh Day of March, 2001

*Attest:*

NICHOLAS P. GODICI

*Attesting Officer*  *Acting Director of the United States Patent and Trademark Office*